(12) United States Patent
Patel et al.

(10) Patent No.: US 6,642,477 B1
(45) Date of Patent: Nov. 4, 2003

(54) METHOD FOR LASER DRILLING A COUNTER-TAPERED THROUGH-HOLE IN A MATERIAL

(75) Inventors: Rajesh S. Patel, Fremont, CA (US); James M. Bovatsek, San Jose, CA (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 10/060,231

(22) Filed: Oct. 23, 2001

(51) Int. Cl.[7] .............................................. B23K 26/00
(52) U.S. Cl. ................................ 219/121.71; 219/121.7
(58) Field of Search ........................ 219/121.71, 121.7, 219/121.67, 121.72, 121.85, 121.78, 121.82

(56) References Cited

U.S. PATENT DOCUMENTS

| | | |
|---|---|---|
| 4,370,540 A | 1/1983 | Davis et al. |
| 4,406,940 A | 9/1983 | Tsutsumi |
| 4,551,608 A | 11/1985 | Opower |
| 4,618,759 A | 10/1986 | Müller et al. |
| 4,689,466 A | 8/1987 | Hoshinouchi et al. |
| 4,689,467 A | 8/1987 | Inoue |
| 4,769,523 A | 9/1988 | Tanimoto et al. |
| 4,873,417 A | 10/1989 | Moriyasu et al. |
| 4,937,424 A | 6/1990 | Yasui et al. |
| 5,229,569 A | 7/1993 | Miyauchi et al. |
| 5,412,174 A | 5/1995 | Saeda et al. |
| 5,462,231 A | * 10/1995 | Hall ........................ 239/585.4 |
| 5,507,799 A | 4/1996 | Sumiya |
| 5,517,420 A | 5/1996 | Kinsman et al. |
| 5,539,175 A | * 7/1996 | Smith et al. ............. 219/121.7 |
| 5,659,479 A | 8/1997 | Duley et al. |
| 5,670,064 A | 9/1997 | Nakata |
| 5,689,327 A | 11/1997 | Takeda |
| 5,756,962 A | 5/1998 | James et al. |
| 5,825,801 A | 10/1998 | Nishida et al. |
| 5,841,096 A | 11/1998 | Takahashi et al. |
| 5,900,171 A | 5/1999 | Karube et al. |
| 6,049,058 A | 4/2000 | Dulaney et al. |
| 6,087,625 A | 7/2000 | Iso |
| 6,133,541 A | 10/2000 | Neubauer et al. |
| 6,140,606 A | 10/2000 | Heikilla et al. |
| 6,156,030 A | 12/2000 | Neev |
| 6,191,385 B1 | 2/2001 | O Loughlin et al. |
| 6,307,175 B1 | * 10/2001 | Blochlinger et al. ... 219/121.71 |
| 6,365,871 B1 | * 4/2002 | Knowles et al. ......... 219/121.7 |
| 6,369,354 B1 | * 4/2002 | Beste ..................... 219/121.71 |

* cited by examiner

*Primary Examiner*—M. Alexandra Elve
(74) *Attorney, Agent, or Firm*—Burns, Doane, Swecker & Mathis, LLP

(57) ABSTRACT

A method of forming a through-hole which is counter-tapered relative to a drilling laser involves directing, along an incidence axis and onto an impingement location on a first surface of a material, a laser beam of sufficient energy to ablate the material, the incidence axis being offset from a normal to the first surface at the impingement location. The material and the laser beam are then relatively rotated, for at least 360°, such that a through-hole having a larger exit opening than entrance opening is formed.

13 Claims, 3 Drawing Sheets

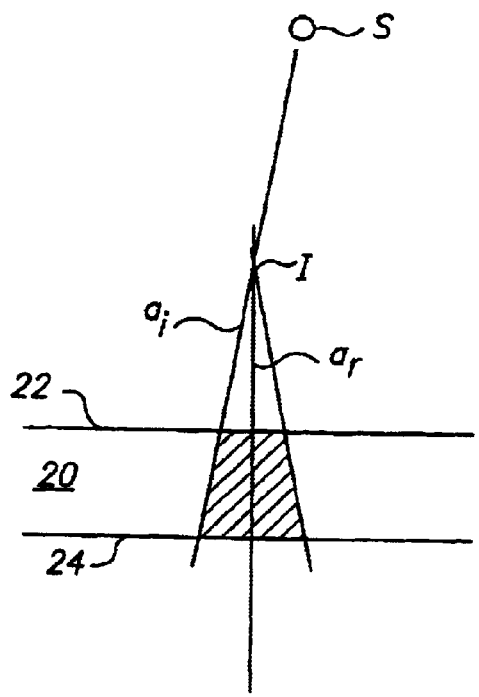
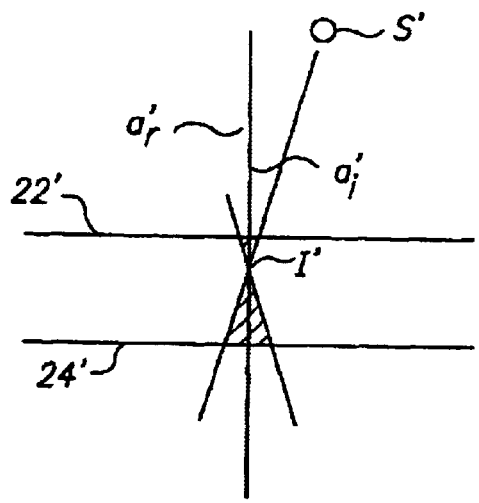
FIG. 5A          FIG. 5B
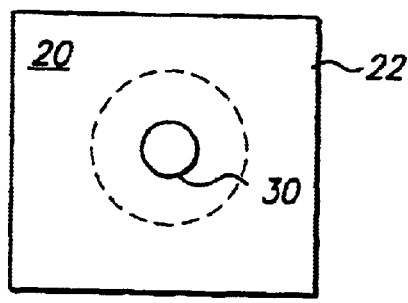
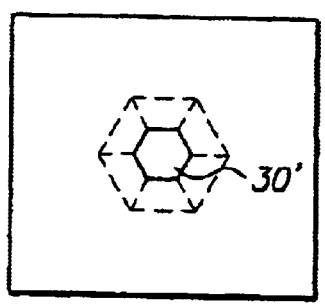
FIG. 6A          FIG. 6B
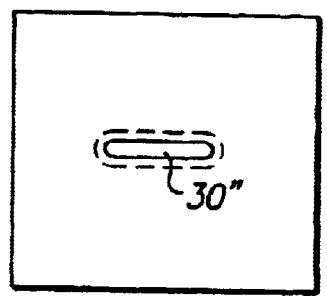
FIG. 6C

METHOD FOR LASER DRILLING A COUNTER-TAPERED THROUGH-HOLE IN A MATERIAL

CROSS-REFERENCE TO RELATED APPLICATIONS (Not applicable)

BACKGROUND OF THE INVENTION

1. Field of the Invention

The invention relates to laser drilling of through-holes in materials.

2. Description of Related Art

Typically, laser-drilling (or laser ablation) of through-holes in various materials results in a hole with the property that the entrance hole (where the laser beam first begins to remove material) has a larger diameter than the exit hole (where the laser beam exits after drilling through the material), thus resulting in a through-hole with tapered sidewalls as shown in FIG. 1. This is especially true for percussion laser drilling in which the laser beam is simply focused on a stationary substrate for the amount of time required to drill completely through the material. The resulting characteristically conical cross-section hole is commonly exploited in various fluid flow applications: the tapered sidewall causes an increase in the velocity of a fluid traveling through the hole in the direction of taper without having to increase the force needed to push the fluid through the hole. To achieve this result, the hole must be fabricated such that the drilling laser travels through the material in the same direction that the fluid will ultimately travel through the material.

For applications in which tapered sidewalls are not desirable, certain optical and/or mechanical methods are commonly employed to approximately equalize the size of the entrance and exit openings of a through-hole, resulting in what is commonly referred to as a high aspect ratio hole, where the aspect ratio is generally defined as the thickness of the material divided by the exit opening diameter. One such common technique for achieving high aspect ratio is known as trepan laser drilling, or laser trepanning. In this method, the material and focused laser spot are moved relative to each other in a closed loop motion (generally circular in the plane of the substrate material) such that a piece of the material is cut out, thereby generating a through-hole of appropriate profile in the substrate. This method can produce through-holes with very steep sidewalls and virtually no taper—that is, with equal entrance opening and exit opening diameters.

Notwithstanding the above, for certain applications and situations a tapered hole is actually desired, but creating one becomes a very difficult task for various reasons, particularly when the direction of taper relative to the impinging laser beam is to be taken into account. One source of difficulty is the presence of obstacles on the side of the material from which the laser must impinge—side $S_1$ in FIG. 1. In such a situation, because of the presence of obstacles (not shown) which limit access to side $S_1$, it would be desirable to impinge the substrate from the opposite side—side $S_2$—such that a counter-tapered through-hole is formed in the substrate. A counter-tapered through-hole, as defined herein, expands away from the drilling laser and therefore has a larger exit opening than entrance opening. Such a hole has heretofore been difficult to drill using conventional laser drilling techniques.

BRIEF SUMMARY OF THE INVENTION

The invention overcomes the shortcomings of the prior art by providing a method of drilling a through-hole in a material having first and second surfaces separated by a predetermined thickness. In accordance with the method of the invention, a laser beam of sufficient energy to ablate the material is directed, along an incidence axis and onto an impingement location on the first surface, with the incidence axis being offset from a normal to the first surface at the impingement location. The material and laser beam are then relatively moved, in a closed path, to produce the desired through-hole profile.

Further in accordance with the invention, a method for drilling counter-tapered through-holes in a fuel injector nozzle having a chamber at least partially defined by a wall having an interior surface adjoining the chamber and an exterior surface opposite to said interior surface is provided. The method in accordance with the invention includes directing, along an incidence axis and onto an impingement location on the exterior surface, a laser beam of sufficient energy to ablate the material of the wall, the incidence axis being offset from a normal to the exterior surface at the impingement location, and relatively rotating the wall and the laser beam such that a through-hole having a larger exit opening than entrance opening is formed.

Further in accordance with the invention, a method of drilling a counter-tapered through-hole in a material having first and second surfaces separated by a predetermined thickness includes directing, along an incidence axis and onto an impingement location on the first surface, a laser beam of sufficient energy to ablate the material, the incidence axis being offset from a normal to the first surface at the impingement location, and relatively moving the material and the laser beam such that a through-hole having a larger exit opening than entrance opening is formed.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein:

FIGS. 5A and 5B are schematic cross-sectional diagrams of counter-tapered holes formed in accordance with the invention; and FIGS. 6A–6C are schematic top plan views of counter-tapered holes formed in accordance with the invention.

DETAILED DESCRIPTION OF THE INVENTION

Figure 2:
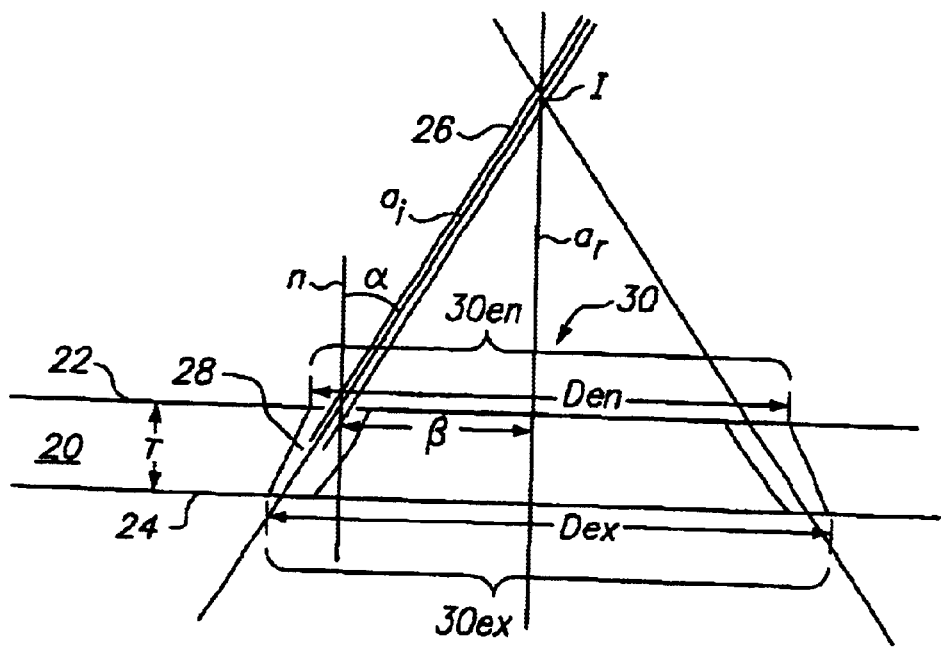
FIG. 2 is a schematic diagram of a laser drilling process in accordance with the invention.

FIG. 2 schematically illustrates a method in accordance with the invention, wherein a substrate 20 having first and second major surfaces 22 and 24, separated by a thickness T, is being drilled by a laser beam 26 directed at major surface 22 along an incidence axis $a_i$. Major surfaces 22 and 24 are shown to be parallel, although this is not necessary. The incidence axis $a_i$ is offset from a normal n to surface 22 passing through incidence location $l_i$ by an offset angle α. The energy of the laser beam is selected such that ablation of the material of substrate 20 takes place under suitable conditions of heat generation, penetration depth, etc., as is required by the particular application.

During the drilling process, substrate 20 is moved along a rotation axis $a_r$, such that an ablation region 28, which, following a full 360° rotation, delimits a counter-tapered through-hole designated generally at 30 in the material of the substrate. It will be appreciated that only relative motion is necessary, and while defined in terms of rotation of substrate 20, the invention can similarly be practiced by suitably moving or rotating the impinging laser beam 26. Through-hole 30 has an entrance opening $30_{en}$ and an exit opening $30_{ex}$, as defined relative to impinging laser beam 26.

As seen from FIG. 2, the incidence and rotation axes $a_i$ and $a_r$, respectively, intersect at a point I along the incidence axis which is outside substrate 20 and which is closer to surface 22 than to surface 24, thereby realizing the characteristic counter-tapered shape of through-hole 30, illustrated in FIG. 5A. The term "counter-tapered," in accordance with the invention, is defined relative to the direction of the impinging laser beam and denotes expansion, or tapering outwards, in the downstream direction of the impinging laser light. With reference again to FIG. 2, the laser beam 26 is used to form a through-hole having an entrance opening diameter $D_{en}$ which is smaller than the exit opening diameter $D_{ex}$. The relative size of the entrance and exit openings $30_{en}$ and $30_{ex}$ is a function of the offset angle α. Moreover, the average size or diameter of the through-hole 30 is a function of an offset distance β, which is defined as the distance between the incidence axis $a_i$ and the rotation axis $a_r$, taken along major surface 22. The average size of through-hole 30 can also be described as a function of intersection point I of the incidence and rotation axes $a_i$ and $a_r$.

Figure 1:
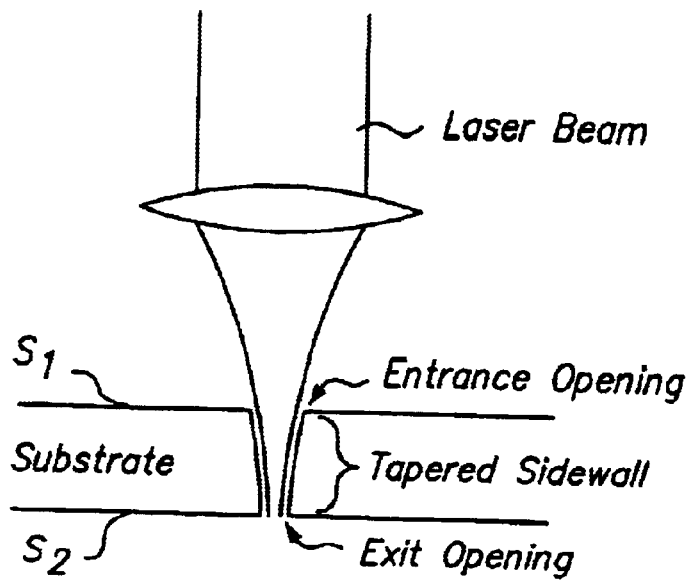
FIG. 1 is a cross-sectional view of a through-hole formed in accordance with conventional laser drilling techniques.
Figure 3:
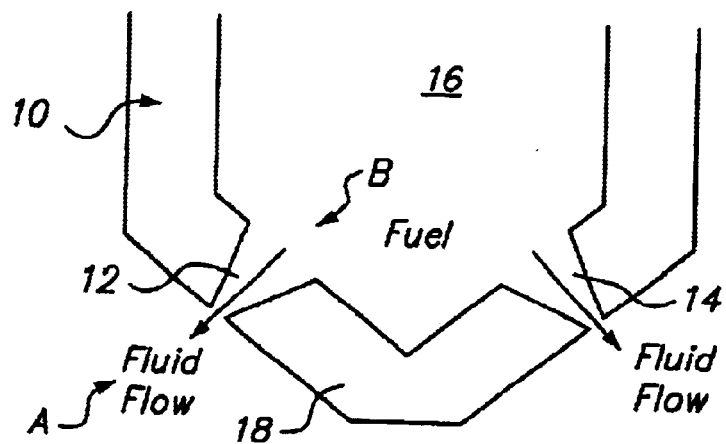
FIG. 3 is a schematic diagram of an inventive fuel injector nozzle having through-holes with desired cross-sectional profiles.

The method of the invention is particularly useful for forming counter-tapered through-holes having a larger opening at an inaccessible side of the material than at the accessible side. Such a material can be wall 18 of fuel injector nozzle 10, as explained with reference to FIG. 3. In fuel injector nozzle 10, it is desirable to provide holes which taper in the direction of fluid flow. By providing such a profile for holes 12 and 14 in fuel injector nozzle 10, the velocity of fuel exiting chamber 16 is increased, improving fuel atomization and combustion efficiency. In accordance with the invention, holes 12 and 14 can be formed using a laser which impinges wall 18 in the A direction. By comparison, conventional drilling techniques would require that the laser impinge in the B direction, but this is obstructed by the nozzle configuration, and specifically by the presence of chamber 16.

Figure 4:
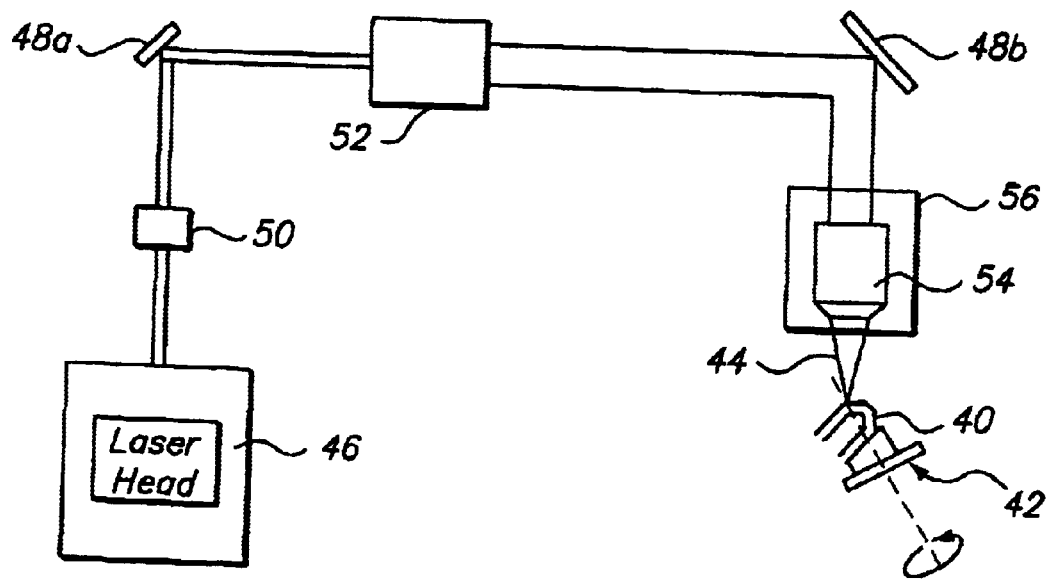
FIG. 4 is a schematic diagram of a system implementing the process of drilling a counter-tapered through-hole in accordance with the invention.

To achieve countered-tapered through-holes in accordance with the invention, a system such as that shown in FIG. 4 is used. In FIG. 4, a fuel injector nozzle 40 is depicted as a workpiece mounted on a rotating stage 42. A laser beam 44 from laser source 46 is directed onto nozzle 40 by mirrors 48a and 48b, after passing respectively through power adjust assembly 50, beam shaping assembly 52, and beam-focusing element 54 of focusing stage 56. Using such an arrangement, a fuel injector nozzle such as that of FIG. 3, having counter-tapered through holes, can be fabricated in accordance with the invention. The characteristics of laser beam 44—for example, its energy, wavelength(s), intensity distribution, shape, etc.—are selected to optimize ablation of the material of fuel injector nozzle 40. It will be appreciated that other applications, for example those in which other materials of different thicknesses are to be ablated, will impose other laser beam characteristics which those of ordinary skill in the art will readily recognize.

The through-hole profile of FIG. 5A is achieved by having the incidence and rotation axes $a_i$ and $a_r$ intersect at a point I along the incidence axis which is outside substrate 20, on the side of surface 22. More generally, the counter-tapered through-hole profile of FIG. 5A is achieved by selecting an intersection point I which is somewhere between the location S of the source of the impinging beam (that is, the location of beam-focusing element 54 in the configuration of FIG. 4) and the proximal surface 22 of the substrate 20.

It may also be desirable, in some situations, to have only partial counter-tapering, as illustrated in FIG. 5B. To realize the through-hole profile of FIG. 5B, the intersection point of axes $a_i'$ and $a_r'$ can be manipulated to lie somewhere between the location S' and the distal surface 24' of the material, but more specifically, between the proximal surface 22' and the distal surface 24'.

FIG. 6A is a top plan view of a counter-tapered through-hole 30 drilled in substrate 20 by a laser beam impinging proximal surface 22 (that is, a laser beam from a source which is above the plane of the drawing figure). It will be appreciated that rather than a relative rotation of the laser beam with respect to substrate 20, a sequence of controlled linear translations, proceeding along a closed path on the substrate, can be applied, for example to achieve a hexagonal counter-tapered through-hole 30', illustrated in FIG. 6B. Alternatively, a combination of curved and linear relative motions, in a closed path, can be used to produce other types of counter-tapered through-holes, such as hole 30" of FIG. 6C.

As an example of an application of the invention, a diode pumped fiber laser emitting a beam at 1064 nm was used. The beam was directed onto an aluminum sheet of 25 micron thickness, and relative rotation of the beam and aluminum sheet was induced. The result was a counter-tapered through-hole having an entrance opening of 72 microns and an exit opening of 100 microns.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method of drilling a through-hole in a material having first and second surfaces separated by a predetermined thickness, the method comprising:

directing, along an incidence axis and onto an impingement location on the first surface, a laser beam of sufficient energy to ablate the material, the incidence axis being offset from a normal to the first surface at the impingement location; and moving the material and the laser beam relative to one another along a closed path on the substrate, wherein moving comprises relatively rotating the material and the laser beam about a rotation axis which intersects the incidence axis at a point along the incidence axis which is closer to the first surface than to the second surface.

2. The method of claim 1, wherein moving comprises relatively rotating the material and the laser beam about a rotation axis which intersects the incidence axis at a point along the incidence axis which is between the first and second surfaces.

3. A method of forming a counter-tapered through-hole in a wall of a fuel injector nozzle, the wall having an interior surface defining a chamber and an exterior surface opposite said interior surface, comprising:

directing, along an incidence axis and onto an impingement location on the exterior surface, a laser beam of sufficient energy to ablate the material of the wall, the incidence axis being offset from a normal to the exterior surface at the impingement location; and rotating the wall and the laser beam relative to one another such that a through-hole having a larger exit opening than entrance opening is formed.

4. The method of claim 3, wherein rotation is effected about a rotation axis which is non-parallel to the incidence axis.

5. The method of claim 3, wherein rotation is effected about a rotation axis which intersects the incidence axis at a point along the incidence axis which is closer to the exterior surface than to the interior surface.

6. A method of drilling a counter-tapered through-hole in a material having first and second surfaces separated by a predetermined thickness, the method comprising:

directing, along an incidence axis and onto an impingement location on the first surface, a laser beam of sufficient energy to ablate the material, the incidence axis being offset from a normal to the first surface at the impingement location; and moving the material and the laser beam relative to one another such that a through-hole having a larger exit opening than entrance opening is formed.

7. The method of claim 6, wherein the material is a wall of a fuel injector nozzle.

8. The method of claim 6, wherein moving comprises relatively rotating the material and the laser beam about a rotation axis which is non-parallel to the incidence axis.

9. The method of claim 6, wherein moving comprises relatively rotating the material and the laser beam about a rotation axis which intersects the incidence axis at a point along the incidence axis which is closer to the first surface than to the second surface.

10. The method of claim 6, wherein rotating is effected to the extent of at least 360°.

11. The method of claim 6, wherein moving comprises relatively rotating the material and the laser beam about a rotation axis which intersects the incidence axis at a point along the incidence axis which is between the first and second surfaces.

12. The method of claim 6, wherein the through-hole is non-circular in shape.

13. The method of claim 1, wherein moving comprises relatively rotating the material and the laser beam about a rotation axis which intersects the incidence axis at a point along the incidence axis which lies outside the material.

* * * * *